Aug. 15, 1950   L. L. STOTT   2,518,504
METHOD FOR FABRICATING NYLON BUSHINGS
Filed June 17, 1947   2 Sheets-Sheet 1
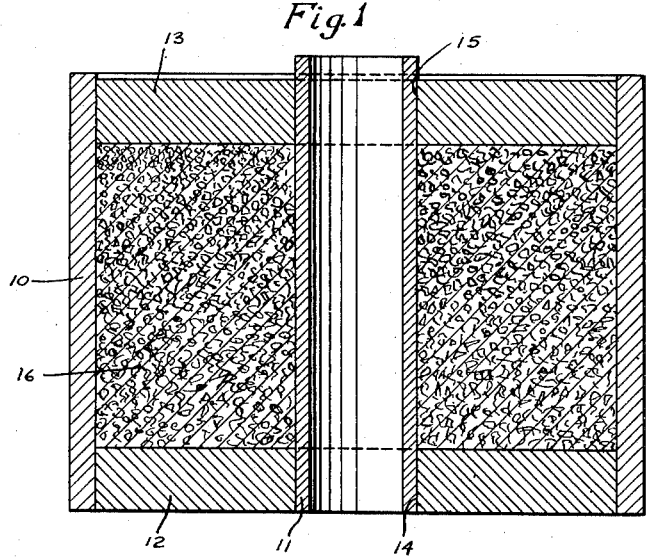
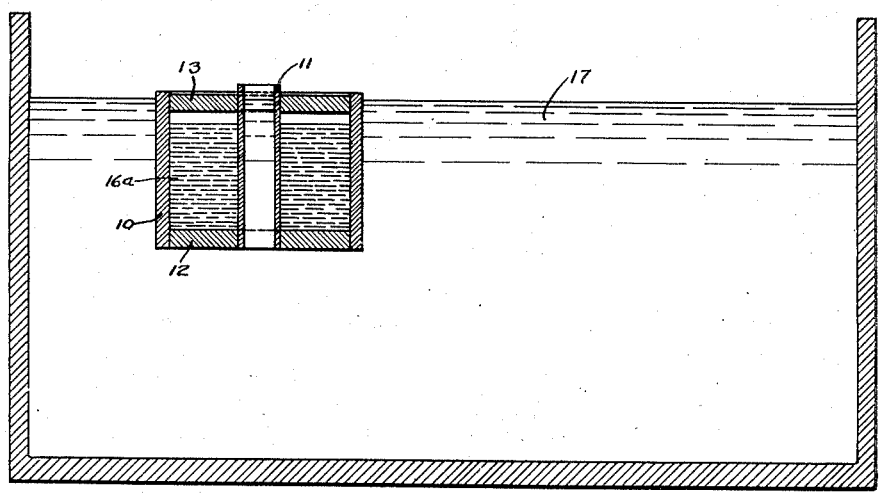
INVENTOR
Louis L. Stott
BY
Synnestvedt & Lechner
ATTORNEYS Aug. 15, 1950    L. L. STOTT    2,518,504
METHOD FOR FABRICATING NYLON BUSHINGS
Filed June 17, 1947    2 Sheets-Sheet 2
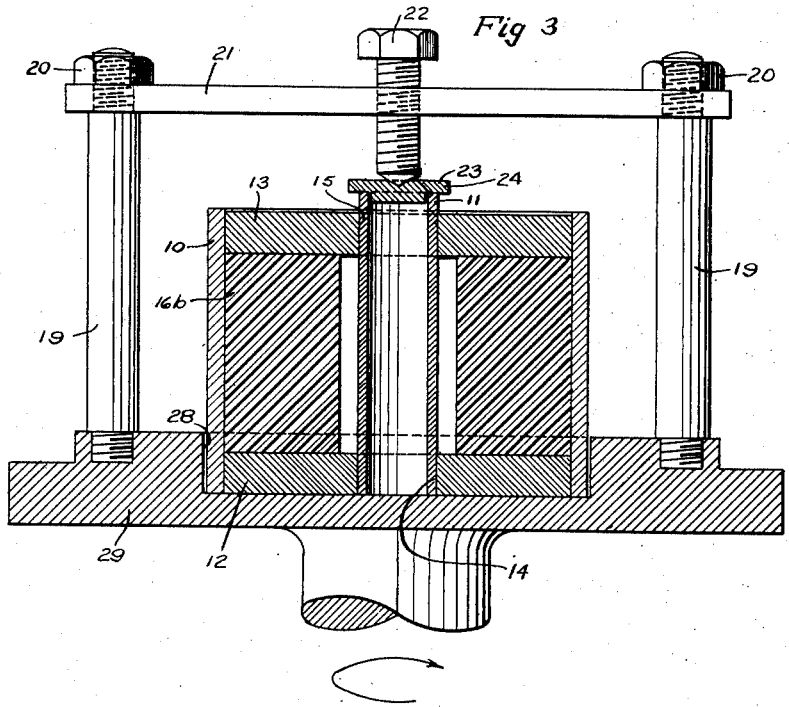
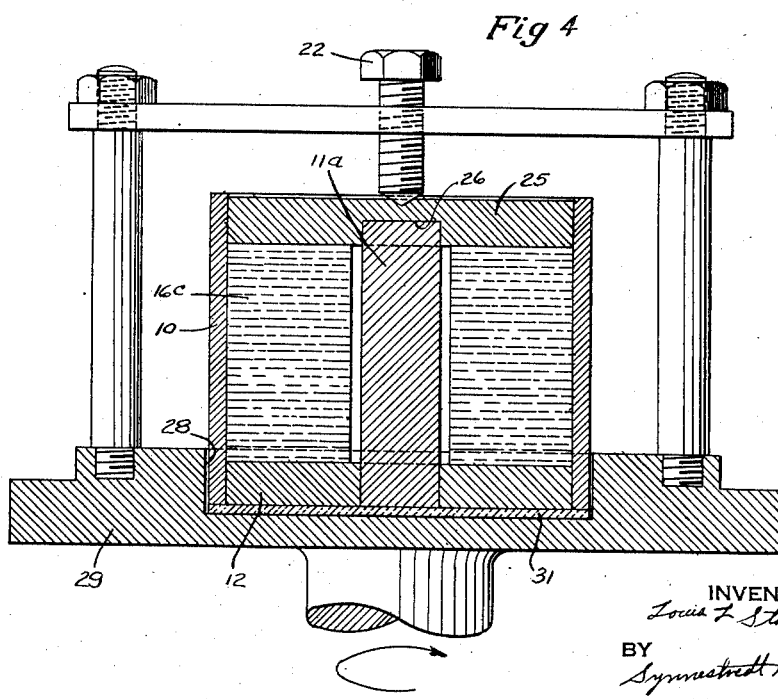
INVENTOR
Louis L. Stott
BY
Synnestvedt & Lechner
ATTORNEYS Patented Aug. 15, 1950

2,518,504

UNITED STATES PATENT OFFICE 2,518,504

METHOD FOR FABRICATING NYLON BUSHINGS

Louis L. Stott, Reading, Pa., assignor to The Polymer Corporation, Reading, Pa., a corporation of Pennsylvania Application June 17, 1947, Serial No. 755,085

8 Claims. (Cl. 18—58.3)

1

This invention has to do with bushings made of plastic materials, and, more particularly, has to do with the fabrication of bushings from thermoplastic materials which are subject to oxidation or degradation even at temperatures at about their melting or softening points, and/or which undergo a large volumetric contraction upon solidification. Most of such thermoplastic materials are also characterized by relatively low thermal conductivity, and because of various of these characteristics it has heretofore been difficult to form cast or molded bushings from them, especially where the bushings are of substantial thickness.

The linear polyamides are typical of materials of the class mentioned, a specific example being polyhexamethylene adipamide, known in the trade as nylon.

While various of the characteristics of the polyamides give rise to difficult problems in the fabrication of bushings, at the same time certain other properties thereof are of particular advantage in bushings, for instance, for bearing purposes, especially where lubrication problems are difficult.

This invention is of particular advantage in the fabrication of bushings from polyamide materials, and is therefore described herebelow as applied to such materials.

Although bushings of relatively small outside diameter may be formed by injection molding, this expedient is not normally suitable in the case of bushings of relatively great length, outside diameter, or having a relatively thick wall, for example, a bushing 8" long, 5" outside diameter, and wall thickness of ½".

In addition, as a result of the characteristic contraction of the polyamides upon solidification, static casting of bushings in a cylindrical mold having a central core is impracticable because the contraction upon cooling is so great that the bushings shrink on the central core with a force so great as to prevent their removal, and, in some cases, as to destroy themselves by cracking, this difficulty being especially troublesome where the bushing has a relatively thick wall.

As a primary object, the invention has in view improved methods for overcoming all of the above-mentioned difficulties involved in the formation of bushings from the synthetic linear polyamide materials.

According to the invention, a mold is provided which is not only adapted to be charged with the material to be molded in solid, granular, or powdered form and to contain the material during the melting process, but which is also adapted, after melting of the material, to be inserted in a centrifugal casting machine.

Another object of the invention is the protection of the material from oxidation during the whole time the material is at an elevated temperature.

The invention also contemplates a method for melting synthetic linear polyamide materials which provides for uniform and rapid penetration of heat to all portions of the material, even where a relatively large mass is being handled.

A further object of the invention is a method for cooling the contents of a bushing mold having a central core under such conditions as to prevent cracking of the bushing upon contraction.

How the foregoing and other objects are attained will be more clearly understood from the description following herebelow and the drawings, in which:

Figure 1 is an axial sectional view of one form of a bushing mold containing a charge of cold molding material in granular or flake form;

Figure 2 is a view of the mold of Figure 1 immersed in a heating bath, the material in the mold being here shown as melted;

Figure 3 is a sectional view of the mold of Figure 1 mounted in a centrifugal casting machine and showing the condition and position of the solidified material; and Figure 4 is a sectional view of a modification of the mold mounted in a centrifugal casting machine and showing the position of the molten material just after the initiation of the spinning operation and before any solidification has occurred.

As has been suggested above, the characteristics of synthetic linear polyamide materials and notably their sensitivity to degradation and oxidation at or near their melting points, render it desirable that the exposure of the molten material to the atmosphere be kept to a minimum. I accomplish this by melting the material in the same vessel in which it is to be solidified, this vessel comprising at one and the same time a mold adapted to determine at least some of the dimensions of the finished bushing, to provide for transfer of heat to the molding material during the melting operation, and to protect the material from contact with the atmosphere throughout the period during which it is at an elevated temperature. The mold, therefore, is adapted for use both in the specialized heating process and the specialized cooling process of the present invention, details of which will appear more fully hereinbelow.

The tendency of synthetic linear polyamide materials to degradation during the melting operation increases with the amount of material being melted, since the low thermal conductivity of the material requires a high temperature gradient to effect transfer of heat to the interior of the mass within a reasonable length of time. If the time is short or the mass large, or both, this temperature gradient will result in raising the external portions of the mass to the degradation point before raising the center to the melting point. By incorporating in the mold a central core adapted to the rapid transfer of heat to the surrounding material in the mold, I have provided for application of heat both externally and internally of the mass of material in the mold. In this way, since the heat is applied from two directions, the temperature gradient is substantially reduced and, therefore, a relatively much larger mass of material may be rapidly heated, notwithstanding the low thermal conductivity thereof, and because of the reduced thermal gradient, degradation is avoided. Furthermore, by reducing the maximum temperature at the outside of the mass, the tendency to oxidation is also substantially reduced. Since the material is completely enclosed during the entire elevated temperature phase of the operation, contact with the atmosphere is minimized, and the combination of these factors greatly reduces any tendency of the material to oxidize.

In the form of the invention illustrated in Figure 1, I employ a mold having a hollow core, preferably open at both ends to permit circulation therein of the heating medium. As the wall of this hollow core need not be thick, it may be made of a variety of materials so long as it has reasonably good thermal conductivity. Steel tubing will serve the purpose, although for a higher rate of heat transfer, bronze or copper may be used.

In the form of the invention illustrated in Figure 4, I employ a solid core of material having high thermal conductivity, for instance bronze or copper, the heat transfer in this case taking place by conduction axially through the metal of the core from the ends thereof.

I eliminate the problem of shrinkage on the central core during solidification of the material by placing the mold containing the molten material in a centrifugal casting machine and spinning the mold during the solidification phase of the process, as a result of which the material is maintained against the outside wall of the mold. Since the cooling of the material is accompanied by a concurrent volumetric contraction, the material progressively shrinks clear of the central core.

Considering now the invention as illustrated in the drawings, Figure 1 shows one form of mold comprising an external sleeve 10 of heat-resisting metal, for example, steel, a hollow core 11, a bottom plug 12, and a top plug 13, both of which are formed of a material, such as bronze, having a higher coefficient of thermal expansion than that comprising sleeve 10. Bottom plug 12 is machined to provide a snug fit in sleeve 10 when cold. Top plug 13 should fit snugly when cold. Bottom plug 12 is cut out, as at 14, and top plug 13 is cut out, as at 15, to engage with and center core 11.

The inside diameter of sleeve 10 and the inside distance between plugs 12 and 13 determine the outside diameter and length of the finished bushing.

According to the practice of the invention, bottom plug 12 is driven into sleeve 10, core 11 is positioned in aperture 14 in the bottom plug, and the granular, unmelted material 16 is charged into the mold. Advantageously, the material is packed into the mold under substantial pressure in order to reduce the interstices between the particles to some extent. Top plug 13 is then inserted and the whole mold placed in a heating bath containing a heating medium 17, as illustrated in Figure 2. As the temperature of the mold rises, the plugs 12 and 13 expand to a greater extent than sleeve 10, thus insuring a liquid-tight fit. Heat transfer to the material is effected not only through sleeve 10 but also through core 11. As illustrated in Figure 2, the hollow core 11 permits circulation of the heating medium 17 therethrough, thus increasing the rate of heat transfer to the central portion of the mold.

After the material is completely melted, the mold is placed in a centrifugal casting machine such as is disclosed in Figure 3, and secured to the spinning plate 29 by studs 19, nuts 20, retainer bar 21 and take up bolt 22. The take up bolt 22 bears against a plug member 23 having a flange 24 which is adapted to engage with the end of core 11. The mold is thus retained in position as against axial movement by take up bolt 22, member 21 and studs 19, and against radial motion by the side wall of circular recess 28 in spinner plate 29 of the centrifugal casting machine.

After the mold is secured in the centrifugal casting machine (with the molten material still in the condition indicated at 16a in Figure 2), it is rotated at a high speed, say from 2000 to 4000 R. P. M., whereupon the action of centrifugal force distributes the molten material axially of the mold in the form of a cylinder in contact with the outside wall (as indicated at 16c in the modification of Figure 4). Upon cooling, the material contracts and thus draws further away from the central core, assuming on solidification a position and condition indicated at 16b in Figure 3.

It will be noted that the retaining force exerted by take up bolt 22 impinges directly upon sleeve 11 and is transmitted axially to spinner plate 29. Top plug 13 is free of the force imposed by the fastening means; and, therefore, the axial dimension of the bushing is not influenced by the operation of mounting the mold in the casting machine, as would be the case if bolt 22 bore directly against unsupported top plug 13.

In Figure 4 I have illustrated an alternative form of mold in which is employed a solid central core 11a of material having higher thermal conductivity than the material being molded. As in the form illustrated in Figure 3, this core penetrates bottom plug 12, whereby to make contact with heating bath 17 during the heating operation. Core 11a, however, need not penetrate the top plug, since I may employ in this form of the invention a plug 25 having a recess 26 adapted to receive the top of core 11a. Since, as above indicated, plug 25 is made of a material such as bronze, heat transfer will also readily take place to the upper end of the core when the mold is immersed in the heating bath. Take up bolt 22 bears against plug 25, but again the force is transmitted axially through core 11a, and this arrangement also provides for fixing the axial dimension of the mold in a manner which will be unaffected by mounting the mold in the spinning machine.

As will be seen, the central core 11 or 11a not only provides for the transfer of heat to the interior of the mass, but also provides for the transmission of the axial thrust incident to maintaining the mold against the spinner plate.

As has been pointed out in my copending application, Serial Number 595,325, filed May 23, 1945, now abandoned, in the molding of synthetic linear polyamide materials the direction of cooling has a pronounced effect on the physical characteristics of the finished article. While a substantial part of the heat transfer from materials being cooled in accordance with the present invention is in the direction of the external sleeve, I have found that there is a pronounced directional cooling effect toward spinner plate 29 of the centrifugal casting machine. In fact, I have discovered that in some cases the rate of heat transfer to the spinner plate may be higher than is desirable, in which case I provide a gasket 31 of asbestos or other insulating material between the bottom plug 12 and spinner plate 29. By properly selecting gasket 31 for thickness and thermal conductivity, I can control the axial cooling of the molded bushing within quite accurate limits. Of course, the gasket is not employed during the heating operation.

Inasmuch as cooling takes place while the mold is being spun, except during the first few revolutions of the mold, the heat transfer from the material is substantially confined to the end plugs and the external sleeve, since the material is almost immediately thrown out of contact with the central core by centrifugal force.

The rate of rotation of the mold during cooling is influenced by a number of factors, including the dimensions of the bushing and the rate and direction of heat transfer from the molten material. In all cases the speed should be high enough so that the liquid material will be thrown clear of the central core. As is well known, the bore of a vertical centrifugal casting may be considered to be, to a first approximation, a parabola, the inclination of the walls from the vertical per unit of height being a function of speed. With vertical castings, therefore, the speed should be great enough so that the parabola will clear the cylindrical core of the mold. With practicable operating speeds, the parabola will clear the core when casting bushings up to about 12" in length, provided the inside diameter is not too small. Bushings of greater length may advantageously be cast horizontally, in which case, as is well known, the bore is substantially cylindrical regardless of length. By horizontal centrifugal cooling, bushings at least 4 feet in length may be made. Whatever the inclination of the axis during spinning, therefore, the speed is selected so that the bushing will not cool in contact with the core, and as a result, the problem of shrinkage on the core, with the resultant difficulty of removal or destruction of the bushing, is completely avoided.

In the various figures, I have shown the position and condition of the material at four stages of the process: in Figure 1, the granular molding material packed into the cold mold; in Figure 2, the position of the molten material under static conditions, showing the net result of the volumetric expansion upon heating and the infilling of the spaces between the granules; in Figure 4, I have shown the position of the molten material at the commencement of the spinning operation, but before contraction and solidification have begun; and in Figure 3, the position of the solidified bushing, indicating the contraction which has taken place concurrently with the cooling of the material.

Attention is called to applicant's copending continuation-in-part application Serial No. 166,790, filed June 8, 1950, which discloses subject matter in common with the present application.

I claim:

1. A method of fabricating cylindrical bushings of synthetic linear polyamide materials which comprises melting the material in a mold having a central core of smaller diameter than the bore of the finished bushing, and rotating the mold during cooling of the contents to produce a bushing having an internal diameter in excess of the core diameter.

2. The process steps in the fabrication of bushings of synthetic linear polyamide materials characterized by high volumetric shrinkage upon solidification and by relatively low thermal conductivity, which comprises introducing the material in particle form into a mold comprising a sleeve and a core therein, the inside diameter of the sleeve being substantially equal to the desired outside diameter of the bushing, and the outside diameter of the core being less than the desired inside diameter of the bushing, applying heat to the sleeve and core to melt the material and thereafter rotating the mold about the axis of the core during cooling thereof.

3. The process of fabricating bushings of synthetic linear polyamide materials characterized by high volumetric shrinkage upon solidification and by relatively low thermal conductivity, which comprises introducing the material in particle form into a mold comprising a sleeve and a core concentric therewith in an amount having a cold volume less than the volume of the mold cavity, the inside diameter of the sleeve being substantially equal to the desired outside diameter of the bushing, and the outside diameter of the core being less than the desired inside diameter of the bushing, applying heat to the material through the core and thereafter cooling the material while rotating the mold to produce a bushing having an inside diameter greater than the diameter of the core.

4. The process steps in the fabrication of bushings from thermoplastic materials, which comprise introducing the material in particle form into a mold comprising a sleeve and a core concentric therewith, the inside diameter of the sleeve being substantially equal to the desired outside diameter of the bushing, and the outside diameter of the core being less than the desired inside diameter of the bushing, effecting transfer of heat to the material in the mold by immersing the mold in a heating bath with the core in heat exchange relation to the bath and rotating the mold about the axis of the core during cooling of the contents thereof.

5. A process in accordance with claim 4 in which the said core comprises a hollow cylinder adapted to be penetrated by the heating bath.

6. A process in accordance with claim 4 in which the said core comprises a solid cylinder having higher thermal conductivity than the material to be molded.

7. A method for forming bushings from a synthetic linear polyamide, which method comprises charging the polyamide in particle form into a mold having a core disposed axially of the bore of the bushing to be formed, melting the polyamide by transfer of heat radially inwardly from the external mold wall and radially outwardly from the core, and cooling the molten polyamide while rotating the mold about the axis of the core.

8. The process steps in the fabrication of bushings of synthetic linear polyamid materials characterized by high volumetric shrinkage upon solidification, by relatively low thermal conductivity, and by sensitivity to oxidation in the molten condition, which steps comprise charging a mold defined by a cylindrical outer wall and a heat conducting core with a mass of material of the type described whose solidified volume is less than the volume of the mold cavity, sealing the mold, transferring heat to the material through the core, and rotating the mold about the axis of the core during cooling of the contents thereof.

LOUIS L. STOTT.

REFERENCES CITED

The following references are of record in the file of this patent:

UNITED STATES PATENTS

| Number | Name | Date |
| --- | --- | --- |
| 1,318,520 | Nolever | Oct. 14, 1919 |
| 1,627,209 | Smith | May 3, 1927 |
| 1,832,066 | Van Webern | Nov. 17, 1931 |
| 2,136,425 | Fields | Nov. 15, 1938 |
| 2,193,899 | Casto et al. | Mar. 19, 1940 |
| 2,305,362 | Taylor | Dec. 15, 1942 |